United States Patent [19]

Arase et al.

[11] Patent Number: 5,552,072
[45] Date of Patent: Sep. 3, 1996

[54] COATED ACICULAR FINE PARTICULATE MATERIALS, PROCESSES FOR PREPARING SAME AND USE THEREOF

[75] Inventors: Takuya Arase; Fumihiro Kamiya; Masayuki Tsuji; Tadashi Ino; Ikuo Kitamura; Yoshiyuki Shibuya; Shigeo Daimon, all of Settsu, Japan

[73] Assignee: Daikin Industries Ltd., Osaka, Japan

[21] Appl. No.: 318,877

[22] PCT Filed: Feb. 17, 1994

[86] PCT No.: PCT/JP94/00242

§ 371 Date: Oct. 18, 1994

§ 102(e) Date: Oct. 18, 1994

[87] PCT Pub. No.: WO94/19276

PCT Pub. Date: Sep. 1, 1994

[30] Foreign Application Priority Data

Feb. 19, 1993 [JP] Japan .................................. 5-054769
Jul. 14, 1993 [JP] Japan .................................. 5-197908

[51] Int. Cl.$^6$ ................................................. C04B 35/00
[52] U.S. Cl. ............................... 252/62.51 R; 252/62.57; 252/62.59; 252/62.55; 428/403

[58] Field of Search .................. 252/62.55, 62.57, 252/62.59, 62.51; 428/403

[56] References Cited

U.S. PATENT DOCUMENTS 4,668,414  5/1987  Okamura et al. .................... 252/62.51

FOREIGN PATENT DOCUMENTS 61-234506  10/1986  Japan .

Primary Examiner—Melissa Bonner
Attorney, Agent, or Firm—Nikaido, Marmelstein, Murray & Oram LLP

[57] ABSTRACT

An acicular fine particulate material which is coated with a compound containing at least one element selected from among elements of Groups III and IV of the Periodic Table in Periods 5 and 6, the acicular fine particulate material being one of (i) an acicular fine particulate material containing iron carbide, (ii) an acicular fine particulate material containing iron carbide, metallic iron and carbon, and (iii) an acicular fine particulate metallic iron containing carbon, is prepared by a promoted reduction reaction while being effectively prevented from sintering and consequently affords magnetic recording media having a high recording density.

19 Claims, No Drawings

COATED ACICULAR FINE PARTICULATE MATERIALS, PROCESSES FOR PREPARING SAME AND USE THEREOF

TECHNICAL FIELD

The present invention relates to coated acicular fine particulate materials, processes for preparing the materials, and magnetic coating compositions and magnetic recording media containing the material.

BACKGROUND ART

Presently, magnetic recording media are commercially available which have various magnetic characteristics. Higher recording densities are the properties required of magnetic media of the next generation. Magnetic powders of higher coercive force are required to fulfill this requirement. The coercive force of magnetic powders is dependent largely on magnetic shape anisotropy attributable to their shape and magnetic crystalline anisotropy attributable to their magnetic energy. The present invention relates to a method of giving an improved coercive force by enhanced shape anisotropy. More particularly, the invention relates to a method of obtaining a high coercive force by using fine particles having a great axial ratio and utilizing the shape thereof for preparing a magnetic powder which is excellent in acicular properties.

Fine particles having an increased axial ratio generally deform and sinter under a thermal load during preparation, encountering difficulty in achieving the contemplated purpose.

Conventionally, fine particles are coated with aluminum, silica or like sintering preventing agent and are thereby prevented from deforming or sintering (e.g., U.S. Pat. No. 4,956,220). However, particulate materials, when in the form of fine particles, are liable to sinter during reaction and therefore require a large amount of sintering preventing agent, which increases the amount of nonmagnetic component and hampers the reduction reaction to result in the drawback of impaired magnetic characteristics.

An object of the present invention is to provide an acicular fine particulate material which is prepared by a promoted reduction reaction while being effectively prevented from sintering and which consequently affords magnetic recording media having a high recording density, and to provide a process for preparing the particulate material, and magnetic coating compositions and magnetic recording media containing the material.

DISCLOSURE OF THE INVENTION

The present invention provides an acicular fine particulate material which is coated with a compound containing at least one element selected from among elements of Groups III and IV of the Periodic Table in Periods 5 and 6, the acicular fine particulate material being one of (i) an acicular fine particulate material containing iron carbide, (ii) an acicular fine particulate material containing iron carbide, metallic iron and carbon, and (iii) an acicular fine particulate metallic iron containing carbon. The invention also provides a process for preparing the coated acicular fine particulate material, and magnetic coating compositions and magnetic recording media containing the particulate material.

The acicular fine particulate material of the present invention is characterized in that the material is coated with a compound containing at least one element selected from among those in Groups III and IV of the Periodic Table in Periods 5 and 6 (hereinafter referred to merely as "Group III or IV elements"). The Periodic Table hereinafter referred to is based on the table in conformity with the classification of subgroups prescribed by IUPAC in 1970.

The acicular fine particulate material of the present invention is (i) an acicular fine particulate material containing iron carbide, (ii) an acicular fine particulate material containing iron carbide, metallic iron and carbon, or (iii) an acicular fine particulate metallic iron containing carbon.

The acicular fine particulate material (i) containing iron carbide is described in detail in JP-B-43683/1989 and has the features of being higher in coercive force and saturation magnetization than conventional iron oxide magnetic powders and excellent in corrosion resistance. Such iron carbide is prepared, for example, by (a) contacting with heating a reducing agent containing no carbon atom with a starting material iron compound selected from among iron oxyhydroxides and iron oxides when required and (b) thereafter contacting a reducing-carbonizing agent containing a carbon atom or mixture of the agent and a reducing agent containing no carbon atom with the resulting iron compound.

Examples of preferred acicular iron oxyhydroxides are acicular α-FeOOH (goethite), β-FeOOH (akaganite) and acicular γ-FeOOH (lepidocrosite), and preferred acicular iron oxides are acicular α-Fe$_2$O$_3$ (hematite), acicular γ-Fe$_2$O$_3$ (maghemite) and acicular Fe$_3$O$_4$ (magnetite).

Acicular α-Fe$_2$O$_3$ or acicular γ-Fe$_2$O$_3$ are, for example, any of those prepared by heating acicular α-FeOOH, acicular β-FeOOH or acicular γ-FeOOH at about 200° to about 350° C., followed by dehydration, acicular α-Fe$_2$O$_3$ or acicular γ-Fe$_2$O$_3$ prepared by heating the resulting product further at about 350° to about 900° to compact the crystals, and others.

The acicular iron oxyhydroxides or acicular iron oxides are usually at least 3, preferably 5 to 15, in average axial ratio and usually up to 2 μm, preferably 0.05 to 1 μm, in average particle size (long axis). The acicular fine particulate iron carbide prepared from such a material is almost unchanged from the starting material in average axial ratio and average particle size.

JP-A-106408/1986 describes in detail the steps (a) and (b) for preparing the acicular fine particulate material containing iron carbide and the reducing agent and reducing-carbonizing agent for use in these steps. Especially desirable carbon-free reducing agents are H$_2$ and NH$_2$NH$_2$, and desirable carbon-containing reducing-carbonizing agents are CO, CH$_3$OH, HCOOCH$_3$ and saturated or unsaturated aliphatic hydrocarbons having 1 to 5 carbon atoms.

In the step (a) of the above, the reducing agent containing no carbon atom :can be used as it is or as diluted. Examples of diluents are N$_2$, argon, helium, etc. The dilution ratio is suitably selected but is preferably about 1.1 to about 10 times (by volume). The contact temperature, contact time, gas flow rate and other conditions depend, for example, on the production history, average axial ratio, average particle size and specific surface area of the acicular iron oxyhydroxide or acicular iron oxide. The preferred contact temperature is about 200° to about 700° C., preferably about 300° to about 400° C. The preferred contact time is about 0.5 to about 6 hours. The preferred gas flow rate (excluding diluent) is about 1 to about 1000 ml S.T.P./min, more preferably about 5 to about 500 ml S.T.P./min, per gram of the starting material. The contact pressure inclusive of that of the diluent is usually 1 to 2 arm. although not limitative particularly.

In the step (b) of the above, the reducing-carbonizing agent containing carbon atom or a mixture thereof with the reducing agent containing no carbon atom can be used as it is or as diluted. When the mixture is used, the mixing ratio of the reducing-carbonizing agent containing carbon atom and the reducing agent containing no carbon atom is suitably selected but is preferably 1/0.05 to 1/5 by volume. Contact conditions are also suitably selected but the preferred contact temperature is about 250° to about 400° C., more preferably about 300° to about 400° C. The preferred contact time is about 0.5 to 6 hours when the contact in (a) is conducted, and about 1 to about 12 hours when the contact in (a) is not conducted. The preferred gas flow rate (excluding diluent) is about 1 to about 1000 ml S.T.P./min, more preferably about 5 to about 500 ml S.T.P./ml, per gram of the starting iron compound. The contact pressure inclusive of that of the diluent is usually 1 to 2 atm. although not limitative particularly.

The product thus obtained consists chiefly of iron carbide, while free carbon and iron oxide can also be present therein. The acicular fine particulate material of the invention containing iron carbide contains at least 20%, preferably at least 50% and more preferably at least 60%, of iron carbide, which is predominantly $Fe_5C_2$, while $Fe_7C_3$, FeC and $Fe_3C$ can be present. The product can further be covered with a protective iron oxide coating by contacting the product with a gas containing oxygen. Unreacted iron oxide can also be present.

The acicular fine particulate material (ii) of the invention containing iron carbide, metallic iron and carbon is described in detail in Japanese Patent Application No. 34086/1992, has a specific range of magnetic characteristics suitable for audio metal tapes, is low in noise level and can be prepared, for example, by contacting a gas mixture of a reducing agent having no carbon atom and a reduction controlling agent with the above acicular fine particulate material containing iron carbide.

The reduction control agent for use in the above means an agent capable of controlling the velocity of reduction of iron carbide with the above reducing agent containing no carbon atom. Examples of such agents are carbon-containing compounds with one or two carbon atoms, and are more specifically carbon monoxide (CO), carbon dioxide ($CO_2$), methane, methanol, ethanol, formic acid, methyl formate, etc., among which CO and $CO_2$ are preferable. CO is especially preferable.

The gas mixture of the reducing agent containing no carbon atom and reduction control agent for use in the reduction of the above comprises a very large amount of the reducing agent containing no carbon atom and a very small amount of reduction control agent. The reducing agent containing no carbon atom to reduction control agent ratio by volume is preferably 1:0.004 to 1:0.0005, more preferably 1:0.0025 to 0.0005. If the proportion of reduction control agent exceeds the above range, the reducing reaction slows down or fails to proceed, whereas when the proportion is smaller than the above range, the agent produces no effect. A part of the reaction control agent present and the hydrocarbon and carbon produced by the reduction of iron carbide can be separated out as free carbon on the surface of metallic iron or iron carbide depending on the conditions involved, which constitute a part of the components of the present acicular fine particulate material (ii).

In the process for preparing the acicular fine particulate material (ii) of the present invention containing iron carbide, metallic iron and carbon, the preferred contact temperature is about 300° to about 400° C. The preferred contact time varies with the amount of material to be treated, treating conditions and composition of fine particles of the invention to be desired, and is about 0.2 to about 6 hours. When required, a diluting agent such as Ns, Ar or He is usable. The diluting ratio can be determined as desired, and may be, for example, 1.1 to 10 times the amount (by volume) of the gas mixture. The preferred rate of flow of the gas mixture other than the diluting agent is about 1 to 1000 ml S.T.P./min per gram of the acicular iron carbide material. Although not limited specifically, the contact pressure of the gas mixture inclusive of the diluting agent is usually 1 to 2 atm.

The acicular fine particulate material (ii) of the present invention preferably contains 10 to 75 wt. % of iron carbide, 15 to 80 wt. % of metallic iron and 5 to 13 wt. % of free carbon. The carbon content of the acicular fine particles of the above can be determined only by elementary analysis, and no carbon or no graphite is detectable using X-rays. It is speculated that the carbon can be amorphous, but details still remain unknown. The carbon content determined by elementary analysis is the total carbon content which is the sum of the carbon content of the iron carbide (7.92% calculated for $Fe_5C_2$) and free carbon content.

The acicular fine particles of the above contain free carbon or iron carbide in addition to metallic iron, and are therefore relatively higher than the conventional metallic magnetic powder in corrosion resistance.

The acicular fine particulate metallic iron (iii) containing carbon (carbon-containing metallic iron) of the invention is described in detail in JP-A-228502/1992 and is prepared, for example, by contacting a reducing agent containing no carbon atom with the foregoing acicular fine particulate material containing iron carbide. The carbon-containing metallic iron is equivalent to conventional metallic iron in coercive force but superior thereto in corrosion resistance and saturation magnetization.

The reason why the carbon-containing metallic iron has excellent magnetic characteristics still remains to be clarified. The conventional acicular fine particulate metallic iron is obtained by directly reducing acicular fine particulate iron oxide, so that the reduction produces water which causes deformation and evolves heat which causes sintering and deformation, failing to afford highly dispersible particles. Further use of a large amount of sintering preventing agent results in lower magnetic characteristics relative to the density, failing to give particles of high saturation magnetization. In contrast, the reduction process for producing the carbon-containing metallic iron does not produce a large amount of water and therefore gives a product of high coercive force and high dispersibility with use of a lesser amount of sintering preventing agent, permitting the metallic iron to exhibit an inherent highly magnetizable property. Furthermore, the reduction of iron carbide to metallic iron forms carbon, which partly separates out (X-ray diifractometry appears to indicate that the separating-out carbon is not graphite but amorphous carbon) to effectively protect the active surface of the metallic iron and impart corrosion resistance, enabling the metallic iron to retain the excellent magnetic characteristics free of deterioration over a prolonged period of time.

Examples of reducing agents having no carbon atom are, like those previously mentioned, $H_2$, $NH_2NH_2$ and the like. The preferred contact temperature is about 300° to about 500° C., and the preferred contact time is about 0.5 to about 6 hours. When required, diluents, the same as those previously mentioned, are usable. The preferred flow rate is about 1 to about 1000 ml S.T.P./min per gram of the acicular fine particulate material containing iron carbide, exclusive of the diluent. The contact pressure including that of the diluent is usually 1 to 2 atm. but is not limited particularly.

The carbon-containing metallic iron of the present invention consists primarily of metallic iron and contains usually 90 to 50 wt. % of metallic iron and usually 2 to 20 wt. %, preferably 5 to 15 wt. %, of carbon. If the carbon content is greater than this range, the improvement in magnetization will be less, whereas when the carbon content is smaller, lower corrosion resistance will result. The carbon content is expressed in terms of a total carbon content which is the sum of the amount of carbon produced during the process for preparing iron carbide serving as the starting material and the amount of carbon formed and separating out during the preparation process of the invention. According to the invention, the content only of carbon can be determined by elementary analysis, while the carbon is not detectable in the form of iron carbide or graphite with use of X-rays. Although we speculate that the carbon might be amorphous, the type of the carbon still remains to be clarified. An iron oxide can further be present in the carbon-containing metallic iron of the invention. The carbon-containing metallic iron obtained according to the invention can be covered with a protective iron oxide coating over the surface by contacting the iron with an oxygen-containing gas. An unreacted iron oxide can also be present in the iron.

The present invention is characterized in that the acicular fine particulate material is coated with a compound containing at least a Group I element or Group IV element. The acicular fine particulate material of the invention, which is coated with (A) the compound containing a Group III element or Group N element, may further be coated with (B) at least one of a nickel compound, copper compound, manganese compound and cobalt compound and/or (C) at least one of a silicon compound and aluminum compound. (These compounds will be referred to as "coating compounds" as the case may be.)

Especially when a cobalt compound is used as the compound (B), the material is further improved in coercive force and magnetization and given higher corrosion resistance at the same time.

Examples of elements from Group III (Groups III a, III b) for use in the present invention are indium, thallium, yttrium, lanthanum and elements of the lanthanide series. The elements of the lanthanide series include cerium, praseodymium, neodymium, promethium, samarium, europium, gadolinium, terbium, dysprosium, holmium, erbium, thulium, ytterbium and lutetium. Examples of elements in Group IV (Groups IV a and IV b) are tin, lead, zirconium and hafnium. When the particulate material is to be coated with a compound of such an element, the compound may be in the form of a hydrochloride, sulfate, nitrate, acetate, oxalate, organic metal salt or the like, and is not limited to a specific form.

Examples of nickel compounds useful for the invention are nickel chloride, nickel nitrate, nickel sulfate, nickel bromide, nickel acetate and the like. Examples of copper compounds are cupric sulfate, copper nitrate, cupric chloride, cupric bromide, copper acetate and the like. Examples of manganese compounds are manganese sulfate, manganese nitrate, manganese chloride, manganese bromide and the like. Examples of cobalt compounds are cobalt chloride, cobalt nitrate, cobalt sulfate, cobalt acetate and the like.

Further examples of silicon compounds are sodium orthosilicate, sodium metasilicate, potassium metasilicate, water glasses of varying compositions, etc. Examples of aluminum compounds are aluminum sulfate, aluminum nitrate, aluminum chloride, various aluminum alums, sodium aluminate, potassium aluminate and the like.

According to the present invention, the particulate material can be coated with the compounds (A), (B) and/or (C) each in an amount of 0.01 to 30 atomic %, preferably 0.01 to 10 atomic %, more preferably 0.1 to 2 atomic %, based on the iron atoms. The amount is preferably in the range of 0.1 to 20 atomic % in the case of the cobalt compound. It is desired that the total amount of costing compounds be not in excess of 100 atomic % based on the iron atoms because if the total amount of coating compounds is greater, lower magnetic characteristics will usually result relative to the density.

The acicular fine particulate material of the present invention containing iron carbide can be prepared, for example, by (1) the step of coating a starting material iron compound selected from among iron oxyhydroxides and iron oxides with a compound containing a Group III or IV element, and (2) the step of contacting a reducing-carbonizing agent containing a carbon atom or a mixture of the agent and a reducing agent containing no carbon atom with the coated iron compound obtained by the step (1) with heating, after contacting the iron compound with a reducing agent containing no carbon atom with heating when required.

The acicular fine particulate material of the invention containing iron carbide, metallic iron and carbon can be prepared, for example, by (1) the step of coating a starting material iron compound selected from among iron oxyhydroxides and iron oxides with a compound containing a Group III or IV element, (2) the step of containing a reducing-carbonizing agent containing a carbon atom or a mixture of the agent and a reducing agent containing no carbon atom with the coated iron compound obtained by the step (1) with heating, after contacting the iron compound with a reducing agent containing no carbon atom with heating when required, and (3) the step of contacting the reaction product obtained by the step (2) with a mixture of a reducing agent containing no carbon atom and a reducing controlling agent with heating.

The acicular fine particulate metallic iron of the invention containing carbon can be prepared, for example, by (1) the step of coating a starting material iron compound selected from among iron oxyhydroxides and iron oxides with a compound containing a Group III or IV element, (2) the step of contacting a reducing-carbonizing agent containing a carbon atom or a mixture of the agent and a reducing agent containing no carbon atom with the coated iron compound obtained by the step (1) with heating, after contacting the iron compound with a reducing agent containing no carbon atom with heating when required, and (3) the step of contacting the reaction product obtained by the step (2) with a reducing agent containing no carbon atom with heating.

As to the coating compounds to be used for coating, it is essential in the present invention to apply the compound (A) containing a Group III or IV element, but optional to apply other compounds, i.e., the nickel compound (B) and the silicon compound (C) or the like. Further such coating compounds are applied in a desired order. While these compounds are applied by a desired method, it is preferable to coat the starting material iron compound, for example, by:

(1) dispersing the iron compound in water,
(2) executing at least once the step of admixing a solution containing at least one of the coating compounds with the material from the preceeding step and the step of causing the coating compound to form a salt sparingly soluble in water to thereby precipitate the coating compound, and (3) filtering the resulting mixture, followed by washing and drying.

According to the invention, the acicular fine particulate material is coated with the coating compound at least over the surface thereof, and the surface may be coated partly or entirely. The salt sparingly soluble in water can be formed by a suitably selected method, for example, usually by pH adjustment or addition of a compound having an anion for converting the coating compound to a sparingly soluble salt. The drying step is executed in a usual manner, for example, by air drying with heating at about 50° to about 150° C.

The acicular fine particulate materials obtained by the present invention have the shape of the starting material iron compound. The acicular fine particulate material (i) containing iron carbide apparently remains unchanged from the starting material in shape, i.e., in average particle size and average axial ratio. On the other hand, the acicular fine particulate material (ii) containing iron carbide, metallic iron and carbon, and the acicular fine particulate metallic iron (iii) containing carbon tend to be smaller in particle size (long axis), but remain almost unchanged in axial ratio due to a diminution in short axis, and are generally within the foregoing ranges in shape. More particularly, they are usually up to 2 μm, preferably 0.05 to 1 μm, in average particle size (long axis) and 3 to 15, preferably 5 to 15, in average axial ratio.

The magnetic coating composition of the present invention can be prepared by dispersing the above acicular fine particles of the present invention in an organic solvent together with a binder. To the composition are added, as required, a dispersing agent, lubricant, abrasive, antistatic agent and like additives.

Hitherto known thermoplastic resins, thermosetting resins, reaction-type resins, or mixtures thereof, can be used as binders in the present invention.

Suitable thermoplastic resins are those which have a softening point of about 150° C. or less, an average molecular weight of about 10,000 to 200,000, and a degree of polymerization of about 200 to 2,000, e.g., a vinyl chloridevinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a polyvinyl fluoride, a vinylidene chloride-acrylonitrile copolymer, a butadiene-acrylonitrile copolymer, a polyamide resin, polyvinyl butyral, cellulose derivatives such as cellulose acetate butyrate, cellulose diacetate, cellulose triacetate, cellulose propionate, cellulose nitrate, and the like, a styrene-butadiene copolymer, a polyester resin, a chlorovinyl etheracrylate copolymer, an amino resin, various synthetic rubber based thermoplastic resins and mixtures thereof.

Suitable thermosetting resins or reaction-type resins have a molecular weight of about 200,000 or less as a coating solution, and when heated after coating and drying, the molecular weight becomes infinite due to reactions such as condensation, addition, and the like. Of these resins, preferred resins are those resins which do not soften or melt before the resin thermally decomposes. Representative examples of these resins are a phenol resin, an epoxy resin, a polyurethane hardening type resin, a urea resin, a melamine resin, an alkyd resin, a silicone resin, an acryl based reactive resin, an epoxy-polyamide resin, a mixture of a high molecular weight polyester resin and an isocyanate prepolymer, a mixture of a methacrylic acid copolymer and a diisocyanate-prepolymer, a mixture of a polyester-polyol and a polyisocyanate, a urea-formaldehyde resin, a mixture of a low molecular weight glycol, a high molecular weight diol and triphenylmethane triisocyanate, a polyamine resin, and mixtures thereof, etc.

These binders can be used singly or in mixture, and the additives can be added to the binders. The binders are used in an amount of preferably 10 to 400 parts by weight, more preferably 30 to 200 parts by weight per 100 parts by weight of the acicular particles.

The organic solvents include ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and glycol monoethyl ether acetate; ethers such as ether, glycol dimethyl ether, glycol monoethyl ether and dioxane; tars (aromatic hydrocarbons) such as benzene, toluene and xylene; chlorinated hydrocarbons such as methylene chloride, ethylene chloride, carbon tetrachloride, chloroform, ethylene chlorohydrin and dichlorobenzene; and the like.

The dispersing agents used include aliphatic acids having 12 to 18 carbon atoms ($R^1COOH$ wherein $R^1$ is an alkyl group having 11 to 17 carbon atoms) such as caprylic acid, captic acid, lauric acid, myristic acid, palmitic acid, stearic acid, oleic acid, elaidic acid, linolic acid, linolenic acid and stearolic acid; metal soaps comprising an alkali metal (such as Li, Na and K) or an alkaline earth metal (such as Mg, Ca and Ba) salt of the above aliphatic acids; lecithin, etc. In addition, higher alcohols having 12 or more carbon atoms and sulfuric esters can be used. These dispersing agents are added in an amount of 1 to 20 parts by weight per 100 parts by weight of the binder.

The lubricants used include silicone oil, graphite, molybdenum disulfide, tungsten disulfide, aliphaticesters obtained from monobasic aliphatic acids having 12 to 16 carbon atoms and monohydric alcohols having 3 to 12 carbon atoms, aliphatic esters obtained from monobasic aliphatic acids having 17 or more carbon atoms and monohydric alcohols (a total of the carbon atoms of the monobasic aliphatic acid and the carbon atoms of the monohydric alcohol are 21 to 23), etc. These lubricants are added in an amount of 0.2 to 20 parts by weight per 100 parts by weight of the binder.

The abrasives used include those which are generally used, such as fused alumina, silicon carbide, chromium oxide, corundum, artificial corundum, diamond, artificial diamond, garnet and emery (main components: corundum and magnetite). The average particle diameter of these abrasives is 0.05 to 5 μm, preferably 0.7 to 2 μm. These abrasives are added in an amount of 7 to 20 parts by weight per 100 parts by weight of the binder.

Examples of the antistatic agents are natural surfactants such as saponin, nonionic surfactants such as alkylene oxide-base, glycerin-base or glycidol-base surfactant; cationic surfactants such as higher alkylamines, quaternary ammonium salts, pyridine and like heterocyclic compounds, phosphonium or sulfonium compounds; artionic surfactants such as those containing a carboxylic acid, sulfonic acid, phosphoric acid, sulfate group or phosphate group and like acid group; ampholytic surfactants such as amino acids, amino sulfonic acid, sulfate or phosphate of aminoalcohol, etc. These antistatic agent can be used singly or in mixture. Although the above compounds are used as antistatic agents, the compounds can be used in some cases, to improve the dispersibility, magnetic characteristics, lubricability or coating ability. These antistatic agents are added in an amount of 1 to 2 parts by weight per 100 parts by weight of the binder.

The magnetic recording medium of the present invention are obtained by coating the above magnetic coating composition on a substrate (support).

The thickness of the support is about 5 to 50 μm, preferably about 70 to 40 μm. The materials used for the support include polyesters such as polyethylene terephthalate and polyethylene-2,6-naphthalate, polyolefins such as polypropylene, cellulose derivatives such as cellulose triacetate and cellulose diacetate, polycarbonate, and the like.

For preventing static discharge or preventing transfer printing, the above supports may have a back coat on the surface opposite the surface provided with the magnetic layer.

The supports may be in any shape such as a tape, sheet, card, disc or drum, and various materials can be used depending upon the shape desired and end use contemplated.

The magnetic coating composition can be applied on the support by various conventional methods including air doctor coating, blade coating, air knife coating, squeeze coating, impregnation coating, reverse roll coating, transfer roll coating, gravure coating, kiss coating, cast coating and spray coating. Other coating methods can also be used.

The magnetic layer formed on the support by the above method is dried after, if desired, the coating has been subjected to a treatment for orienting the magnetic powder in the layer. If required, the magnetic layer can be subjected to a surface smoothening treatment, or cut to the desired shape, to thereby form the magnetic recording material of this invention. In the above orienting treatment for the magnetic layer, the orienting magnetic field can be either an AC or DC magnetic field with a field strength of about 500 to 5,000 gauss. The drying temperature can range from about 50° to about 100° C., and the drying time is about 3 to 10 minutes.

BEST MODE FOR CARRYING OUT THE INVENTION

The invention will be described below in detail by showing examples and comparative examples.

In the following examples, characteristic, etc. are determined by the-methods given below.

(1) Magnetic Characteristics

Using a magnetic characteristics measuring device of the sample-vibrating type, the powder was tested in a magnetic field with a strength of 10 kOe for coercive force and saturation magnetization, and the sheet was tested at a field strength of 5 kOe for coercive force (Hc, Oe), saturation magnetic flux density (Bm, gauss), residual magnetic flux density (Br, gauss) and square ratio (Br/Bm).

(2) SFD (Switching Field Distribution)

SFD was determined by preparing a differentiation curve of coercive force with use of the differentiation circuit of the above device for a sheetlike test piece, measuring the half-value width of the curve and dividing the measured value by the peak value of coercive force of the curve.

(3) Elementary Analysis for C, H and N

The sample was subjected to elementary analysis in the conventional method using MT2 CHN CORDER Yanaco, product of Yanagimoto Mfg. Co., Ltd, with passage of oxygen (helium carrier) at 900° C.

The corrosion resistance of the acicular fine particulate material of the invention can be evaluated by the corrosion resistance test method described in JP-A-228502/1992. More specifically, the sample was allowed to stand in air at 100° C. for 8 hours, and the resulting reduction in the amount of magnetization ($\sigma s$) was calculated as the corrosion resistance (%), Corrosion resistance (%)=(1- b/a)×100 where a and b are the amounts of magnetization ($\sigma s$) of the sample before and after the standing, respectively. The lower the value, the greater is the corrosion resistance.

The proportions of components of the acicular fine particulate materials of the present invention can be determined from the result of elementary analysis and the amount of saturation magnetization measured. Particularly described below is how to determine the proportion of metallic iron in the acicular fine particulate material (ii) containing iron carbide, metallic iron and carbon.

1) Elementary analysis is made to determine the total carbon contents of the acicular fine particulate material (ii) of the invention containing iron carbide, metallic iron and carbon, iron carbide starting material and fine particulate metallic iron prepared by the process of Comparative Example 5 given below.

2) The amounts of saturation magnetization of these three kinds of materials were measured.

3) The proportion $\alpha$ of metallic iron was calculated from the following equation.

$$\alpha = \{100 y_1 - 303 \times B \times (100 - x_1)/279\}/(A - 303 \times B/279) \quad A = 100 \times y_3/100 - x_3$$

$$B = 27900 \times Y_2 / \{303 \times (100 - x_2)\}$$

$x_1$: total carbon content (%) of acicular fine particulate material (ii) of the invention $x_2$: total carbon content (%) of iron carbide starting material $x_3$: total carbon content (%) of fine particulate metallic iron obtained by the process Comparative Example 5

$y_1$: amount of saturation magnetization (emu/g) acicular fine particulate material (ii) of the invention $y_2$: amount of saturation magnetization (emu/g) iron carbide starting material $y_3$: amount of saturation magnetization (emu/g) of fine particulate metallic iron obtained by the process of Comparative Example 5

In the tables, for example, neodymium acetate will be referred to briefly as Nd acetate, nickel acetate as Ni acetate and sodium aluminate as Na aluminate as the case may be.

EXAMPLE 1

In 7 liters of water were dispersed 250 g acicular goethite particles, 0.3 μm in average particle size (long axis) and 10 in average axial ratio, and the dispersion was adjusted to pH 5 by adding acetic acid thereto. Next, 4.77 g of $Nd(CH_3COO)_3 \cdot H_2O$ for giving an Nd/Fe ratio of 0.5 atomic % and 1.40 g of $Ni(CH_3COO)_2 \cdot 4H_2O$ for giving an Ni/Fe ratio of 0.2 atomic % were added to the dispersion. The mixture was adjusted to a pH of 8.5 by dropwise addition of $Na_2CO_3$ aqueous solution and further to a pH of 11 by addition of NaOH aqueous solution. To the resulting mixture was added 3.69 g of water glass No. 3 (sodium silicate solution, JIS K1408, 9~10% $Na_2O$, 28~30% $SiO_2$) so that Si/FeOOH=0.2 wt. % (Si/Fe=0.63 atomic %), followed by dropwise addition of an aqueous solution of acetic acid for the adjustment to pH 8.5 and further by filtration, washing with water and drying.

The resulting goethite, which was coated with Nd/Ni/Si, was placed into a muffle furnace and heated at 600° C. for 1 hour to obtain an $\alpha$-$Fe_2O_5$ powder. A 40 g quantity of the $\alpha$-$Fe_2O_3$ powder was placed into a reactor tube and treated with CO at a flow rate of 5 liters/min at 370° C. for 3.5 hours. With the gas replaced by nitrogen, the powder was cooled approximately to room temperature, and the gas was thereafter gradually replaced by air to obtain a powder containing iron carbide. The X-ray (Cu K$\alpha$ source) diffraction pattern of the product was in match with that of $Fe_5C_2$ on ASTM X-ray Powder Data File 20-509. The iron carbide-containing powder contained 88 wt. % of $Fe_5C_2$ as iron carbide and had the magnetic characteristics of 979 Oe in coercive force Hc and 91.2 emu/g in saturation magnetization $\sigma$ s.

A 5 g quantity of the powder and 1 g of modified polyvinyl chloride-acetate resin were admixed with and dispersed in 12.5 g of a solvent mixture of methyl ethyl ketone, toluene and cyclohexanone to prepare a magnetic coating composition, which was then applied to a polyethylene terephthalate (PET) film to a thickness of about 5 µm (as dried) in an orientation magnetic field to obtain a magnetic sheet. The sheet was 922 Oe in coercive force, 2040 G in residual magnetic flux density Br, 0.85 in square ratio Sq (Br/Bm) and 0.62 in switching field distribution SFD.

EXAMPLE 2

A 25 g quantity of the above powder containing iron carbide was placed into a reactor tube and treated with hydrogen at a flow rate of 10 liters/min at 400° C. for 60 minutes. With the gas replaced by nitrogen, the powder was cooled approximately to room temperature, and the gas was thereafter gradually replaced by air to obtain a powder of metallic iron containing carbon. The powder had the magnetic characteristics of 1708 Oe in coercive force Hc and 158.8 emu/g in saturation magnetization $\sigma$ s, and was 8 wt. % in total carbon content and 60 $m^2$/g in BET specific surface area as determined by nitrogen adsorption method.

In the same manner as above, a magnetic sheet was prepared which was 1718 Oe in coercive force, 4300 G in residual magnetic flux density Br, 0.90 in square ratio Sq (Br/Bm) and 0.37 in switching field distribution SFD.

EXAMPLES 3 AND 4

Powders containing iron carbide were prepared in the same manner as in Example 1 with the exception of using the corresponding coating compounds listed in Table 1. Each powder was further made into a powder of metallic iron containing carbon in the same manner as in Example 2. Table 1 shows the magnetic characteristics of the powders obtained.

COMPARATIVE EXAMPLE 1

A powder of carbon-containing metallic iron was prepared in the same manner as in Example 2 except that compounds containing aluminum and silicon, respectively, were used as coating compounds as listed in Table 1. Table 1 shows the magnetic characteristics of the powder obtained.

COMPARATIVE EXAMPLE 2

A powder of carbon-containing metallic iron was prepared in the same manner as in Comparative Example 1 except that the starting material was replaced by one with a long axis size of 0.4 µm. Table 1 shows the magnetic characteristics of the powder obtained.

EXAMPLES 5 TO 14

Powders containing iron carbide were prepared in the same manner as in Example 1 with the exception of using the corresponding coating compounds listed in Tables 2 and 3. Each of the powders was further made into a powder of carbon-containing metallic iron in the same manner as in Example 2. Tables 2 and 3 show the magnetic characteristics of the powders obtained.

COMPARATIVE EXAMPLE 3

$\alpha$-$Fe_2O_3$ coated with the sintering preventing agent listed in Table 3 was reacted with hydrogen only at 400° C. for 6 hours and then oxidized gradually to prepare fine particulate metallic iron. The amount of sintering preventing agent used was small to result in poor magnetic characteristics. The product had relatively high corrosion resistance because sintering reduced the surface area and because the material was initially low in saturation magnetization.

COMPARATIVE EXAMPLES 4

Carbon-free metallic iron was prepared in the same manner as in Comparative Example 3 except that the sintering preventing agent was used in the amount listed in Table 3. Use of the increased amount of sintering preventing agent resulted in diminished saturation magnetization and low corrosion resistance.

COMPARATIVE EXAMPLE 5

Six kg of acicular goethite particles, 0.4 µm in average particle size (long axis) and 10 in average axial ratio, were dispersed in 194 liters of water, a small amount of alkali solution (20% of NaOH solution) was added to the dispersion to adjust the pH to at least 13, and 0.1 kg water glass No.3 (sodium silicate solution, about 0.26% of Si based on $\alpha$-FeOOH) was thereafter added to the dispersion, followed by stirring. The aqueous dispersion was adjusted to pH 5 with 1N HCl and filtered 1 hour later, followed by drying. The resulting powder was placed into a muffle furnace and heated at 600° C. for 1 hour to obtain $\alpha$-$Fe_2O_3$ powder.

A 3 kg quantity of the $\alpha$-$Fe_2O_3$ powder was placed into a reactor tube and treated with CO at a flow rate of 90 liters/min at 365° C. for 8 hours. With the gas replaced by nitrogen, the powder was cooled approximately to room temperature, and the gas was thereafter gradually replaced by air to obtain an Iron carbide powder. The Iron carbide powder obtained was treated with $H_2$ only at a flow rate of 5 liters/min at 320° C. for 2 hours, whereby a metallic iron powder ($\alpha$-Fe) was obtained.

In the Tables, NdAc stands for Nd acetate, NiAc Ni acetate, WG water glass, NaAlm Na aluminate, LaAc La acetate, CeAc Ce acetate, SmAc Sm acetate, GdAc Gd acetate, YAc Y acetate, product A particles containing iron carbide, product B metallic iron particles containing carbon, and product C metallic iron containing no carbon.

TABLE 1

|  | Example | | | | Com. Ex. | |
| --- | --- | --- | --- | --- | --- | --- |
|  | 1 | 2 | 3 | 4 | 1 | 2 |
| size of starting material (long axis) | 0.3 μm | 0.3 μm | 0.3 μm | 0.3 μm | 0.3 μm | 0.4 μm |
| coated element (atomic %) | | | | | | |
| Nd/Fe | 0.5 | 0.5 | 1.0 | 0.5 | — | — |
| Ni/Fe | 0.2 | 0.2 | — | 0.5 | — | — |
| Cu/Fe | — | — | 0.5 | — | — | — |
| Al/Fe | — | — | — | — | 0.81 | 0.81 |
| Si/Fe | 0.63 | 0.63 | — | 0.63 | 0.85 | 0.85 |
| coated compound | NdAc NiAc WG | NdAc NiAc WG | NdAc CuSO$_4$ | NdAc NiAc WG | NaAlm WG | NaAlm WG |
| product | A | B | B | B | B | B |
| powder characteristics | | | | | | |
| Hc (Oe) | 979 | 1708 | 1666 | 1756 | 1448 | 1610 |
| saturation magnetization (emu/g) | 91.2 | 158.8 | 157.4 | 153.8 | 153.6 | 150.0 |
| corrosion resistance (%) | 14.5 | 16.4 | 16.5 | 16.9 | 16.9 | 14.8 |
| sheet characteristics | | | | | | |
| Hc (Oe) | 922 | 1718 | 1685 | 1776 | 1429 | 1600 |
| residual magnetic flux density (G) | 2040 | 4300 | 4180 | 4060 | 3560 | 4272 |
| square ratio (Br/Bm) | 0.85 | 0.90 | 0.89 | 0.88 | 0.88 | 0.89 |
| SFD | 0.62 | 0.37 | 0.42 | 0.47 | 0.56 | 0.47 |

TABLE 2

|  | Example | | | | | | |
| --- | --- | --- | --- | --- | --- | --- | --- |
|  | 5 | 6 | 7 | 8 | 9 | 10 | 11 |
| size of starting material (long axis) | 0.3 μm | 0.3 μm | 0.3 μm | 0.3 μm | 0.3 μm | 0.3 μm | 0.3 μm |
| coated element (atomic %) | | | | | | | |
| coated III or IV relative to Fe | Nd/Fe 0.5 | Nd/Fe 0.5 | La/Fe 0.5 | Ce/Fe 0.5 | Sm/Fe 0.5 | Gd/Fe 0.5 | Y/Fe 0.5 |
| Ni/Fe | — | — | 0.5 | 0.5 | 0.5 | 0.5 | — |
| Cu/Fe | — | — | — | — | — | — | — |
| Co/Fe | 0.5 | 12 | — | — | — | — | 12 |
| Al/Fe | — | — | — | — | — | — | — |
| Si/Fe | 0.63 | 0.63 | 0.63 | 0.63 | 0.63 | 0.63 | 1.27 |
| coated compound | NdAc CoSO$_4$ WG | NdAc CoSO$_4$ WG | LaAc NiAc WG | CeAc NiAc WG | SmAc NiAc WG | GdAc NiAc WG | YAc CoSO$_4$ WG |
| product | B | B | B | B | B | B | B |
| powder characteristics | | | | | | | |
| Hc (Oe) | 1755 | 1851 | 1720 | 1744 | 1724 | 1737 | 1832 |
| saturation magnetization (emu/g) | 160.2 | 169.5 | 160.6 | 161.9 | 161.9 | 161.4 | 159.1 |
| corrosion resistance (%) | 15.4 | 12.4 | 15.3 | 15.8 | 15.7 | 15.7 | 13.5 |
| sheet characteristics | | | | | | | |
| Hc (Oe) | 1728 | 1836 | 1714 | 1729 | 1705 | 1708 | 1891 |
| residual magnetic flux density (G) | 4047 | 4560 | 4109 | 4079 | 4028 | 4171 | 4252 |
| square ratio (Br/Bm) | 0.88 | 0.89 | 0.89 | 0.89 | 0.88 | 0.90 | 0.88 |
| SFD | 0.43 | 0.41 | 0.41 | 0.41 | 0.42 | 0.40 | 0.42 |

TABLE 3

|  | Example | | | Com. Ex. | |
| --- | --- | --- | --- | --- | --- |
|  | 12 | 13 | 14 | 3 | 4 |
| size of starting material (long axis) | 0.3 μm | 0.3 μm | 0.3 μm | 0.3 μm | 0.3 μm |
| coated element (atomic %) | | | | | |
| coated III or IV relative to Fe | Zr/Fe 0.5 | Zr/Fe 2 | Zr/Fe 2 | — | — |
| Ni/Fe | 0.5 | 0.5 | — | — | — |
| Cu/Fe | — | — | — | — | — |
| Co/Fe | — | — | 8 | — | — |
| Al/Fe | — | — | — | 0.81 | 2.2 |
| Si/Fe | 0.63 | 0.63 | 0.63 | 0.85 | 5.2 |
| coated compound | ZrCl$_2$ NiAc WG | ZrCl$_2$ NiAc WG | ZrCl$_2$ CoSO$_4$ WG | NaAlm WG | NaAlm WG |
| product | B | B | B | C | C |
| powder characteristics | | | | | |
| Hc (Oe) | 1776 | 1861 | 1862 | 754 | 1460 |
| saturation magnetization (emu/g) | 161.9 | 141.5 | 150.3 | 127.4 | 126.4 |
| corrosion resistance (%) | 16.3 | 16.3 | 14.4 | 12.6 | 34.4 |
| sheet characteristics | | | | | |
| Hc (Oe) | 1823 | 1866 | 1885 | 683 | 1444 |
| residual magnetic flux density (G) | 4100 | 3842 | 4021 | 2476 | 3338 |
| square ratio (Br/Bm) | 0.88 | 0.89 | 0.88 | 0.64 | 0.84 |
| SFD | 0.43 | 0.42 | 0.43 | 1.12 | 0.49 |

Industrial Applicability

The present invention provides an acicular fine particulate material which is prepared by a promoted reduction reaction while being effectively prevented from sintering and which consequently affords magnetic recording media having a high recording density, and provides a process for preparing the particulate material, and magnetic coating compositions and magnetic recording media containing the material.

We claim:

1. An acicular fine particulate material which is coated with a compound (A) containing at least one element selected from among elements of Groups III and IV of the Periodic Table in Periods 5 and 6, and at least one additional compound selected from the group consisting of (B) at least one of a nickel compound copper compound, manganese compound and cobalt compound and (C) at least one of a silicon compound and aluminum compound, the acicular fine particulate material being one of (i) an acicular fine particulate material containing iron carbide, (ii) an acicular fine particulate material containing iron carbide, metallic iron and carbon, and (iii) an acicular fine particulate metallic iron containing carbon.

2. An acicular fine particulate material as defined in claim 1 wherein the Group III element is a rare earth element.

3. An acicular fine particulate material as defined in claim 2 wherein the rare earth element is an element of the lanthanide series.

4. An acicular fine particulate material as defined in claim 3 wherein the element of the lanthanide series is neodymium.

5. An acicular fine particulate material as defined in claim 2 wherein the rare earth element is yttrium.

6. An acicular fine particulate material as defined in claim 1 wherein the Group IV element is zirconium.

7. An acicular fine particulate material as defined in claim 1 wherein the amount of each of the coated compound is 0.01 to 30 atomic % based on the iron atoms.

8. An acicular fine particulate material as defined in claim 1 wherein said compound (B) comprise at least one of a nickel compound and cobalt compound said compound (C) comprises a silicon compound, and said compound (A) comprises at least one element selected from among Y, Nd and Zr.

9. An acicular fine particulate material as defined in claim 1 wherein the material is up to 2 μm in average particle size (long axis) and 3 to 15 In average axial ratio.

10. An acicular fine particulate material as defined in claim 1 wherein the acicular fine particulate material (ii) containing iron carbide, metallic iron and carbon comprises 10 to 75 wt. % of iron carbide, 15 to 80 wt. % of metallic iron and 5 to 13 wt. % of free carbon.

11. An acicular fine particulate material as defined in claim 1 wherein the acicular fine particulate material (iii) containing carbon consists primarily of metallic iron and contains 2 to 20 wt. of carbon based on the metallic iron.

12. An acicular fine particulate material as defined in claim 1 wherein the iron carbide comprises predominantly Fe$_5$C$_2$.

13. A process for preparing an acicular fine particulate material containing iron carbide which comprises:

(1) coating a starting material iron compound selected from among iron oxyhydroxides and iron oxides with a compound (A) containing at least one element selected from among elements of Group III or IV of the Periodic Table in Periods 5 and 6, and at Least one compound (B) comprising a nickel compound, a copper compound, a manganese compound and a cobalt compound and/or at least one compound (C) comprising a silicon compound and an aluminum compound; and (2) contacting a reducing carbonizing agent containing a carbon atom or a mixture of said reducing carbonizing agent and a reducing agent containing no carbon atom with the coated iron compound obtained by the step (1) with heating.

14. A process for preparing the acicular fine particulate material (ii) containing iron carbide, metallic iron and carbon of claim 1 which comprises (1) the step of coating a starting material iron compound selected from among iron oxyhydroxides and iron oxides with a compound containing at least one element selected from among elements of Group III or IV of the Periodic Table in Periods 5 and 6, (2) the step of containing a reducing-carbonizing agent containing a carbon atom or a mixture of the agent and a reducing agent containing no carbon atom with the coated iron compound obtained by the step (1) with heating, after contacting the coated iron compound with a reducing agent containing no carbon atom with heating when required, and (3) the step of contacting the reaction product obtained by the step (2) with a mixture of a reducing agent containing no carbon atom and a reducing controlling agent with heating.

15. A process for preparing the acicular fine particulate metallic iron (iii) containing carbon of claim 1 which comprises (1) the step of coating a starting material iron compound selected from among iron oxyhydroxides and iron oxides with a compound containing at least one element selected from among elements of Group III or IV of the Periodic Table in Periods 5 and 6, (2) the step of contacting a reducing-carbonizing agent containing a carbon atom or a mixture of the agent and a reducing agent containing no carbon atom with the coated iron compound obtained by the step (1) with heating, after contacting the coated iron compound with a reducing agent containing no carbon atom with heating when required, and (3) the step of contacting the reaction product obtained by the step (2) with a reducing agent containing no carbon atom with heating.

16. A process for preparing the acicular fine particulate metallic iron (iii) containing carbon of claim 1 which comprises (1) the step of contacting a reducing-carbonizing agent containing a carbon atom or a mixture of the agent and a reducing agent containing no carbon atom with a starting material iron compound coated with a compound containing at least one element selected from among elements of Group III or IV of the Periodic Table in Periods 5 and 6, after contacting the coated iron compound with a reducing agent containing no carbon atom with heating when required, (2) the step of contacting the reaction product obtained by the step (7) with a reducing agent containing no carbon atom with heating.

17. A magnetic coating composition comprising the acicular fine particulate material of claim 1 as a magnetic material.

18. A magnetic recording medium comprising the acicular fine particulate material of claim 1 as a magnetic material.

19. The process as claimed in claim 13 further including contacting said coated iron compound starting material with a reducing agent containing no carbon atom to form an intermediate reduced composition; and then contacting said intermediate reduced composition with said reducing agent comprising at lest one compound containing a carbon atom.

* * * * *